United States Patent
Hinkelmann et al.

(10) Patent No.: US 9,243,549 B2
(45) Date of Patent: Jan. 26, 2016

(54) ACTUATING DEVICE FOR AN EXHAUST FLAP

(75) Inventors: Achim Hans Hinkelmann, Ingolstadt (DE); Michael-Stefan Staneff, Gaimersheim (DE); Rüdiger Seidel, Dresden (DE)

(73) Assignees: AUDI AG, Ingolstadt (DE); SCHERDEL INNOTEC FORSCHUNGS—UND ENTWICKLUNGS GMBH, Marktredwitz (DE)

( * ) Notice: Subject to any disclaimer, the term of this patent is extended or adjusted under 35 U.S.C. 154(b) by 3 days.

(21) Appl. No.: 13/880,886

(22) PCT Filed: Oct. 11, 2011

(86) PCT No.: PCT/EP2011/005070
§ 371 (c)(1),
(2), (4) Date: Apr. 22, 2013

(87) PCT Pub. No.: WO2012/052124
PCT Pub. Date: Apr. 26, 2012

(65) Prior Publication Data
US 2013/0333379 A1     Dec. 19, 2013

(30) Foreign Application Priority Data
Oct. 23, 2010   (DE) .......................... 10 2010 049 466

(51) Int. Cl.
*F02D 23/00*     (2006.01)
*F02B 37/00*     (2006.01)
(Continued)

(52) U.S. Cl.
CPC .............. *F02B 37/00* (2013.01); *F01D 17/105* (2013.01); *F02B 37/186* (2013.01); *F05D 2220/40* (2013.01); *F05D 2260/30* (2013.01); *Y02T 10/144* (2013.01)

(58) Field of Classification Search
CPC .......... F02B 37/186; F02B 37/18; F02D 9/10; F02D 9/1065; F02D 11/04; Y02T 10/144

USPC ........ 60/602; 251/279, 298, 64; 411/520–523
See application file for complete search history.

(56) References Cited

U.S. PATENT DOCUMENTS 1,392,561 A * 10/1921 Duffy ............................ 403/146
3,427,897 A *  2/1969 Engelmann ..................... 74/588
(Continued)

FOREIGN PATENT DOCUMENTS

| DE | 102007018618 | 10/2007 |
| DE | 102006022482 | 12/2007 |

(Continued)

OTHER PUBLICATIONS

International Search Report issued by the European Patent Office in International Application PCT/EP2011/005070 on Jan. 30, 2012.

*Primary Examiner* — Thomas Denion
*Assistant Examiner* — Jessica Kebea
(74) *Attorney, Agent, or Firm* — Henry M. Feiereisen LLC (57) ABSTRACT

An actuating device includes an exhaust flap of a supercharging pressure control of turbocharged internal combustion engines. The exhaust flap is arranged pivotably in an exhaust pipe, in particular in the housing of a turbine of an exhaust-gas turbocharger, and controls in dependence on the compressor-side supercharging pressure the opening cross section of a bypass line which circumvents the turbine. The exhaust flap is arranged on an actuator arm which is fastened on a shaft mounted rotatably in the exhaust pipe and adjustable from outside the exhaust pipe via an adjustment lever and a control rod which is articulated thereto and via a linear control motor. In order to avoid vibration-induced buzzing noise in the actuating device, a friction damper is connected into the force flow between the shaft and the control rod, in particular for system damping in the region of the exhaust flap.

10 Claims, 5 Drawing Sheets

(51) Int. Cl.
  *F01D 17/10* (2006.01)
  *F02B 37/18* (2006.01)

(56) References Cited

U.S. PATENT DOCUMENTS

| | | | | |
|---|---|---|---|---|
| 3,695,777 | A * | 10/1972 | Westphal et al. | 415/208.1 |
| 4,363,600 | A * | 12/1982 | Thebert | 415/156 |
| 4,542,852 | A * | 9/1985 | Orth et al. | 236/92 B |
| 4,808,069 | A * | 2/1989 | Bonner et al. | 415/160 |
| 5,211,537 | A * | 5/1993 | Langston et al. | 415/209.2 |
| 5,423,646 | A * | 6/1995 | Gagnon | 411/184 |
| 5,630,571 | A * | 5/1997 | Kipp et al. | 251/214 |
| 5,697,253 | A * | 12/1997 | Papenhagen et al. | 74/470 |
| 5,735,306 | A * | 4/1998 | Olds et al. | 137/116.5 |
| 6,895,947 | B2 * | 5/2005 | Allmang et al. | 123/559.3 |
| 8,215,902 | B2 * | 7/2012 | Major et al. | 415/161 |
| 8,414,248 | B2 * | 4/2013 | Perez et al. | 415/1 |
| 2006/0213195 | A1 * | 9/2006 | Leavesley | 60/605.1 |
| 2011/0099999 | A1 * | 5/2011 | Natali | 60/602 |
| 2012/0216534 | A1 * | 8/2012 | Werstat et al. | 60/611 |
| 2013/0139502 | A1 * | 6/2013 | Chu | 60/602 |
| 2013/0189072 | A1 * | 7/2013 | Wade | 415/1 |
| 2014/0140831 | A1 * | 5/2014 | Tschirschke | 415/182.1 |

FOREIGN PATENT DOCUMENTS

| | | |
|---|---|---|
| DE | 102009013815 A1 * | 9/2010 |
| DE | 102010043147 A1 * | 10/2011 |
| DE | 102010026799 A1 * | 1/2012 |
| DE | 202012004719 U1 * | 7/2012 |
| DE | 102011121391 A1 * | 6/2013 |
| DE | 102012105402 A1 * | 12/2013 |
| EP | 1 256 703 | 11/2002 |
| EP | 2693016 A2 * | 7/2013 |
| FR | 2 823 795 | 10/2002 |
| WO | WO 2007/103860 | 9/2007 |
| WO | WO 2012094153 A2 * | 7/2012 |
| WO | WO 2013015985 A1 * | 1/2013 |
| WO | WO2013133986 A1 * | 9/2013 |

* cited by examiner

ACTUATING DEVICE FOR AN EXHAUST FLAP

CROSS-REFERENCES TO RELATED APPLICATIONS

This application is the U.S. National Stage of International Application No. PCT/EP2011/005070, filed Oct. 11, 2011, which designated the United States and has been published as International Publication No. WO 2012/052124 and which claims the priority of German Patent Application, Serial No. 10 2010 049 466.6, filed Oct. 23, 2010, pursuant to 35 U.S.C. 119(a)-(d).

BACKGROUND OF THE INVENTION

The invention relates to an actuating device for an exhaust flap of a supercharging pressure control of turbocharged internal combustion engines.

In generic actuating devices noises may occur as a result of bearing clearances and joint clearances and as a result of excitation caused by operational vibrations of the internal combustion engine and by exhaust gas pulsations and are observed especially at the beginning deactivation of the compressor-side supercharging pressure or when the exhaust flap begins to withdraw from its valve seat in the exhaust pipe or also when the exhaust flap is open. The noises can also be caused as a result of high frequency impacting of the exhaust flap upon its valve seat, or as a result of resonance vibrations in the actuating device.

SUMMARY OF THE INVENTION

Object of the invention is to counteract noise development and/or an associated wear in the actuating device in a simple manner in terms of structure and manufacture.

This object is achieved according to the invention by an actuating device for an exhaust flap of a supercharging pressure control of turbocharged internal combustion engines, wherein the exhaust gas flap is arranged pivotally in an exhaust pipe, in particular in the housing of a turbine of an exhaust gas turbocharger, and controls in dependence on the compressor-side supercharging pressure the opening cross section of a bypass line which circumvents the turbine, with the exhaust flap arranged on an actuator arm which is secured on a shaft rotatably mounted in the exhaust pipe and adjustable outside the exhaust pipe via an adjustment lever and control rod articulated thereto and via a linear control motor, wherein a friction damper is connected in the force flow between the shaft and the control rod, in particular for system damping in the region of the exhaust flap.

Advantageous refinements of the invention are set forth in the further patent claims.

It is proposed according to the invention to connect a friction damper in the force flow between the shaft and the control rod of the actuating device. The friction damper is able to effectively eliminate the noise-causing high-frequency vibrations in the exhaust flap and to minimize associated wear without adversely affecting control or regulation of the supercharging pressure. The friction damper may be integrated for example in the mounting of the exhaust-flap-supporting shaft.

Preferably, it is, however, proposed to arrange the friction damper at the articulation point between the adjustment lever and the control rod and to implement it in particular by a spring which biases the control rod and the adjustment lever against one another in the joint region. As a result, the joint acts directly as friction damper in a structurally particularly simple manner to reduce encountered vibrations.

The articulation point can be formed as a simple pivot joint and have a bearing pin on which the control rod and/or the adjustment lever are mounted, with the spring being accordingly adjusted or held on the bearing pin. The spring can be a helical compression spring or, preferably, be a disk spring, which is slipped on one side or both sides onto the bearing pin and, when secured, maintains a corresponding tension in the joint.

As an alternative, it is proposed to implement the spring in the form of a U-shaped leg spring or leaf spring, having legs acting on the control rod on one hand and on the adjustment lever on the other hand, or biases them against one another. Such a spring requires virtually no additional space and is easy to adapt.

The spring can be installed in a particularly simple manner when attaching the spring via a one-sided open oblong hole of at least one leg to the bearing pin only transversely to the joint axis and holding it formfittingly in pull-off direction. One of the attached legs of the spring can hereby engage behind a head that is formed on the bearing pin and thus be reliably secured against inadvertent detachment.

As an alternative, the spring may be placed on at least one leg via an incorporated recess onto the bearing pin in the direction of the joint axis and held by at least one retaining ring that is fastened to the bearing pin. The retaining ring ensures at all times (even when the leg spring fails) that the joint connection is maintained.

Furthermore, a friction disk can be provided between the control rod and the adjustment lever and attached to the bearing pin to be able to further influence the vibration-damping function of the joint connection. The at least one friction disk may hereby be made of a suitable material with appropriate friction coefficients, for example, a plastic material.

According to an advantageous refinement of the invention, the leg spring may be held non-pivotally in a defined position on the joint connection in order to ensure the free movement of the joint connection and also a defined damping function, when the space conditions are tight for example.

To prevent pivoting, the semi-circular base portion of the leg spring can be provided in a constructively simple way with a slot-shaped recess, which surrounds the control rod. This requires that the leg spring is first slipped onto the control rod during the assembly, and then the joint connection is realized. As an alternative or in addition, at least one leg of the leg spring may have two border-side bevels which embrace the flattened portion of the control rod or the adjustment lever on both sides.

Finally, assembly of the joint connection can be simplified when the bearing pin of the joint connection is secured via a rivet connection to the control rod or to the adjustment lever and has a portion of greater diameter which is inserted in a bearing bore of the adjustment lever or of the control rod and held by the retaining ring.

BRIEF DESCRIPTION OF THE DRAWING

Several exemplary embodiments of the invention are now explained in greater detail below with further details. The schematic drawing shows in:

FIG. 4b a perspective illustration of only the leg spring of the joint connection of FIG. 4a;

FIG. 6 a further alternative joint connection, depicting a disk spring arranged between the control rod and the adjustment lever mounted, again by way of a section taken along the line III-III of FIG. 2a.

DETAILED DESCRIPTION OF PREFERRED EMBODIMENTS

Figure 1:
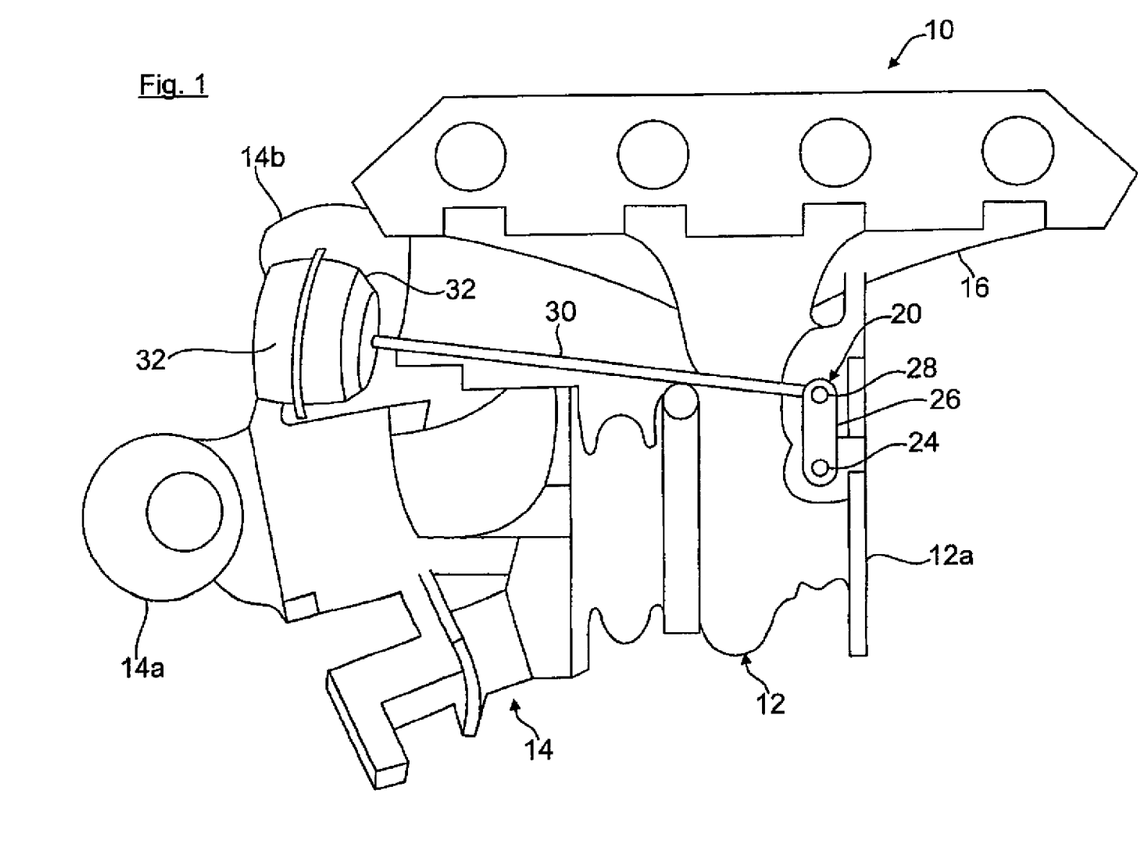
FIG. 1 an actuating device according to the prior art for an exhaust flap of a supercharging pressure control of a turbocharged internal combustion engine for motor vehicles, with a control rod and an adjustment lever which acts via a shaft on a pivotally mounted exhaust flap within the housing of a turbine of an exhaust-gas turbocharger.

FIG. 1 shows a turbocharger assembly 10 according to the prior art for supercharged internal combustion engines in motor vehicles, which is described only to the extent as it is necessary for the understanding of the present invention.

The assembly 10 includes an exhaust-gas turbine (not shown) which is rotatably mounted in a housing 12 and connected in a known manner in driving relationship to the impeller of a compressor 14. The compressor 14 draws combustion air via ports 14a, 14b and discharges it at a defined supercharging pressure via a not shown supercharging pressure conduit to the combustion chambers of the internal combustion engine.

Exhaust gas of the internal combustion engine acts on the exhaust gas turbine and is fed via an exhaust manifold 16 that is connected to the housing 12, and then flows via a central outflow flange 12a to the further exhaust-gas system of the internal combustion engine.

A bypass line is incorporated in a known manner within the housing 12 for conducting exhaust gas upstream of the turbine directly into the outflow flange 12a for controlling the compressor-side supercharging pressure.

For this purpose, an exhaust flap 18 (cf. FIG. 2a) of an actuating device, generally designated with 20, is provided in the housing 12 and attached to an actuator arm 22 and cooperates in a manner not shown with a valve seat which defines the opening cross section of the bypass line and is integrated in the housing 12. The exhaust flap 18 can close the valve seat when resting against the valve seat or increasingly move away from the valve seat during deactivation to thereby increasingly open the flow-through cross section of the bypass line.

Figure 2A:
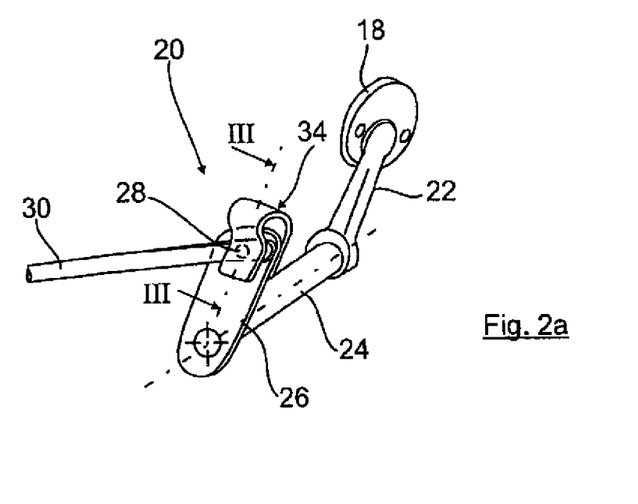
FIG. 2a the actuating device according to the invention as a detail with partly shown control rod and adjustment lever which is firmly connected with the exhaust-flap-supporting shaft, with the joint connection between the control rod and the adjustment lever being realized by a leg spring as a vibration damper.

The actuating device 20 has a shaft 24 which is rotatably mounted in the housing 12 and guided to the outside and to which the exhaust flap 18 is secured within the housing 12 via the actuator arm 22 and an adjustment lever 26 is secured outside the housing 12. The securement of the actuator arm 22 may be realized for example by a welded joint, and the securement of the adjustment lever 26 may be realized by a plug and screw connection.

A control rod 30 which is preferably flattened in the joint region engages the adjustment lever 26 (cf. also FIG. 1) via a joint connection with a bearing pin 28 and is linearly adjustable by, for example, a pneumatic control motor 32 as actuator to thereby pivot the exhaust flap 18 for controlling the supercharging pressure of the internal combustion engine.

The joint connection between the control rod 30 and the adjustment lever 26 is designed at the same time as friction damper for absorbing high-frequency vibrations at the exhaust flap 18.

Figure 2B:
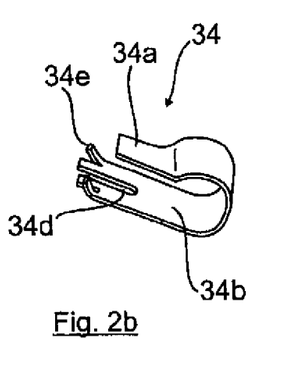
FIG. 2b a perspective illustration of a first embodiment (FIG. 3a) of the leg spring only.

Arranged to the mentioned joint connection with the bearing pin 28 is for this purpose a U-shaped leg spring 34 (FIGS. 2a and 2b) which is made, for example, of flat spring steel and has legs 34a, 34b (cf. FIG. 3a) adjoining the semi-circular base portion 34c to maintain the flattened portion of the control rod 30 and the corresponding portion of the adjustment lever 26 under tension against one another such as to act as friction damper or vibration damper.

The constructive design is hereby such that this tension eliminates joint clearances and attenuates vibrations on the exhaust flap, without encountering inadmissible sluggishness of the joint connection. The friction damping can be influenced in a targeted way by surface treatment of adjoining contact surfaces.

Figure 3A:
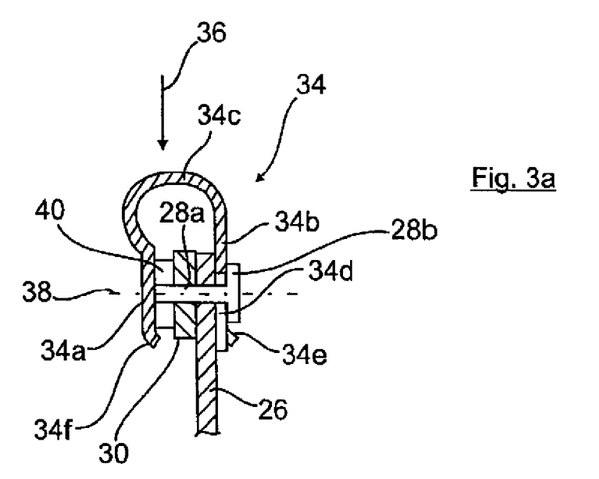
FIG. 3a a section of the joint connection between the control rod and the adjustment lever taken along line of FIG. 2a, depicting a leg spring attached transversely to the joint axis.

The leg spring 34 is attached onto the bearing pin 28 in the direction of arrow 36 or transversely to the joint axis 38 of the joint connection. For this purpose, the one leg 34b of the leg spring 34 has an oblong hole 34d (see also FIG. 2b), which is open in attachment direction and via which the leg 34b can be slipped onto the shank 28a of the bearing pin 28 preferably by formfitting and friction fit, with the leg 34b having in addition a bevel 34e which is slanted relative to the attachment direction and engages behind the head 28b of the bearing pin 28 in a form-fitting manner to thereby secure the leg spring 34 against inadvertent detachment in opposition to the attachment direction 36.

The other leg 34a of the leg spring 34 is designed without oblong hole and spans in the mounted position the bearing pin 28 which, e.g., maintains integrity of the joint connection by means of a retaining ring 40. The leg 34a with its tension thus acts via the bearing pin 28 and the retaining ring 40 virtually indirectly upon the control rod 30. An additional, slanted bevel 34f on the leg 34a provides additional safeguard against inadvertent detachment of the leg spring 34.

Figure 3B:
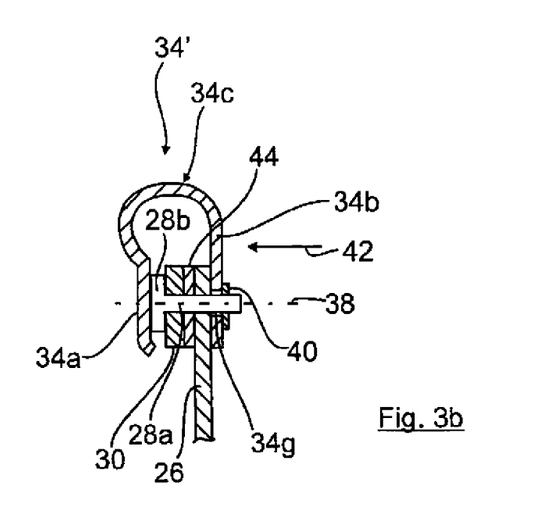
FIG. 3b a section of an alternative joint connection between the control rod and the adjustment lever taken along line III-III of FIG. 2a, depicting a retaining ring holding the joint connection and the leg spring.

FIG. 3b shows an alternative embodiment of the leg spring 34', which is described to the extent as it differs significantly from the embodiment according to FIG. 3a. Functionally similar parts are given the same reference numerals.

Figure 2C:
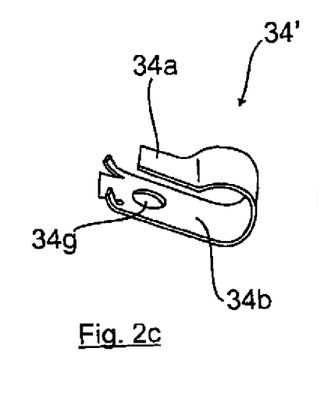
FIG. 2c a perspective illustration of a second embodiment (FIG. 3b) of the leg spring only.
Figure 2D:
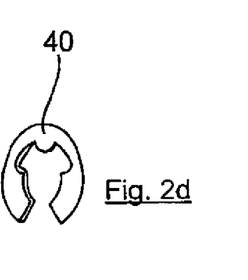
FIG. 2d an exemplary illustration of a retaining ring.

According to the embodiment of FIG. 3b, the one leg 34b of the leg spring 34' (see also FIG. 2c) is provided with a recess or bore 34g and positioned via the latter on the bearing pin 28, mounted in reverse disposition, and then held by the clipped retaining ring 40.

Further shown here by way of example is a friction disk 44 which is placed between the flattened portion of the control rod 30 and the corresponding portion of the adjustment lever 26 and which is made of a friction-increasing material or plastic and further enhances the vibration-damping effect of the described joint connection.

Figure 4A:
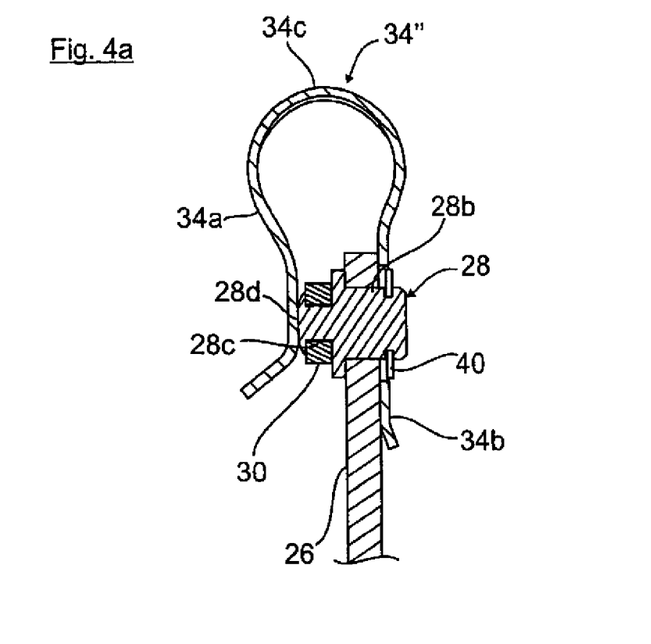
FIG. 4a a section of a further alternative joint connection between the control rod and the adjustment lever taken along line III-III of FIG. 2a, depicting bearing pin secured by rivet connection.
Figure 4B:
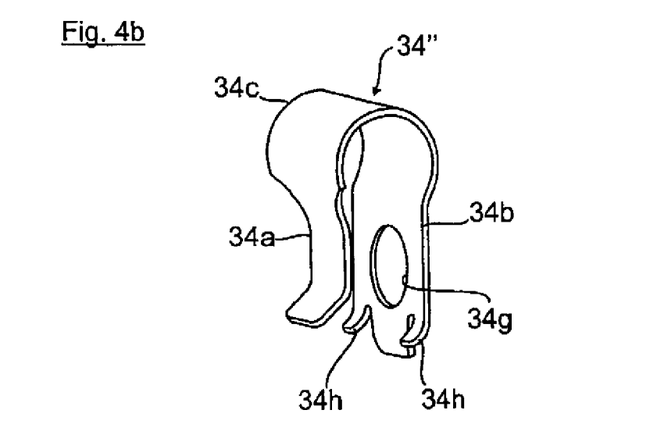

FIGS. 4a and 4b show a further alternative embodiment of the joint connection between the control rod 30 and the adjustment lever 26, which is described only to the extent as it differs significantly from the preceding embodiments. Functionally similar parts are given the same reference numerals.

According to FIG. 4a, the bearing pin 28 has a portion 28c which is smaller in diameter and inserted through the flattened portion of the control rod 30 and which has formed thereon a rivet head 28d for a riveted connection with the control rod 30.

The shank 28b which is greater in diameter is inserted into the corresponding bearing bore of the adjustment lever 26 and held by the attached retaining ring 40.

The recess 34g (cf. also FIG. 4b) provided in the leg 34b of the leg spring 34" is here greater than the outer diameter of the retaining ring 40. This has the advantage that prior to the mounting of the leg spring 34, the control rod 30 can be mounted with the bearing pin 28 on the adjustment lever 26 and the securing ring 40 can be attached. After being attached, the leg spring 34 is adjusted on the retaining ring 40 or held against detachment.

The leg spring 34" or its legs 34b are further provided on both marginal zones (FIG. 4b) with bevels 34h which project inwardly towards the other leg 34a and which embrace in mounting position (not shown in FIG. 4a) the side surfaces of the adjustment lever 26 to thereby prevent pivoting. The leg spring 34 therefore remains in the upright position in relation to the adjustment lever 26, as illustrated in FIG. 4a.

Figure 5:
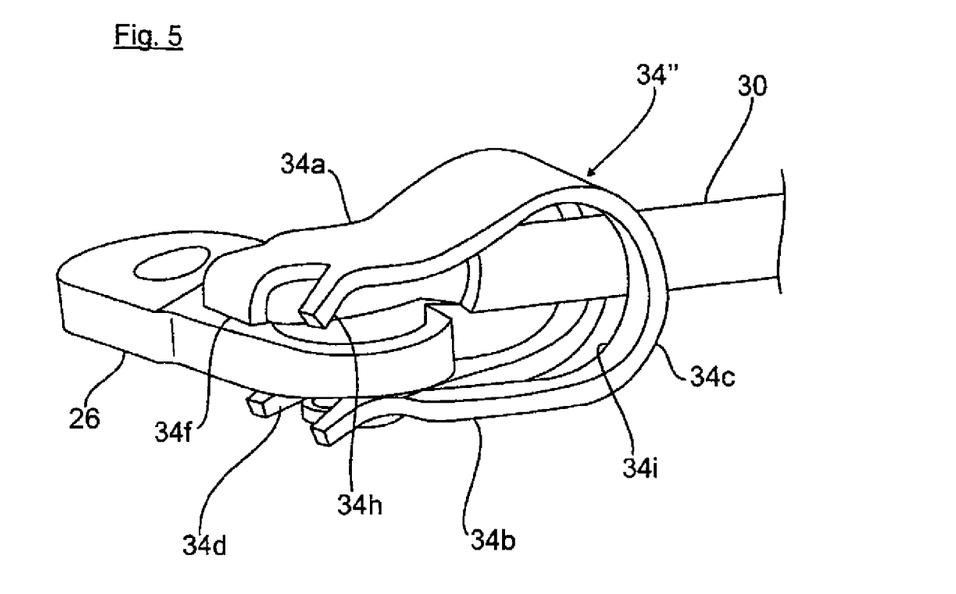
FIG. 5 a further alternative joint connection with a leg spring being secured on the control rod against pivoting.

FIG. 5 shows another embodiment of the joint connection, in which the leg spring 34''' is provided at its approximately semi-circular base portion with a slot-shaped recess 34i which prevents the leg spring 34 from pivoting.

The recess 34i has hereby a slot width which corresponds approximately to the diameter of the control rod 30.

To assemble the joint connection, the leg spring 34''' is initially slipped with its slot-shaped recess 34i over the control rod 30. Then, the control rod 30 is connected to the adjustment lever 26 via the bearing pin 28 and subsequently slipped in longitudinal direction of the control rod 30 over the joint connection, with the lateral flanks of the oblong hole 34d engaging in an annular groove (not shown) that is incorporated in the shank 28b of the bearing pin 28. A further inwardly projecting bevel 34f (like in FIG. 3a) ensures that the leg spring 34''' is prevented from detachment.

Figure 6:
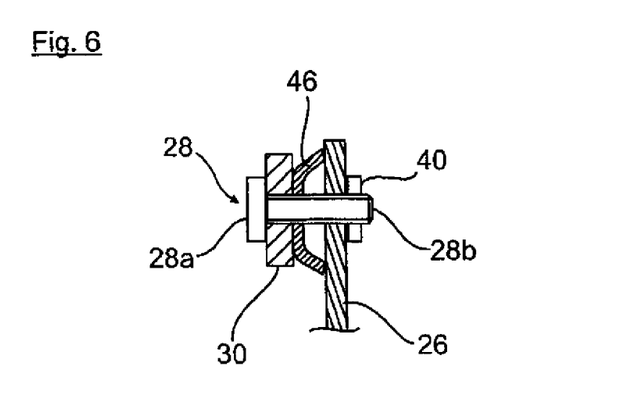

FIG. 6 finally shows a further modified joint connection between the control rod 30 and the adjustment lever 26, wherein a disk spring 46 is arranged on the bearing pin 28 and between the control rod 30 and the adjustment lever 26 and is resiliently biased via the retaining ring 40 to thereby also act as a friction damper.

The invention is not limited to the described embodiments. Thus, a friction damper may be provided in addition or as alternative also in the mounting of the shaft 24, which supports the exhaust flap 18, and may be configured by biasing springs and/or friction disks.

The exhaust flap 18 as described can be arranged in a manner known per se also outside the exhaust-gas turbine in an upstream exhaust pipe with a branching bypass line.

The invention claimed is:

1. An actuating device, comprising:
a control rod;
a shaft rotatably mounted in an exhaust pipe and adjustable from outside the exhaust pipe via the control rod;
an actuator arm secured on the shaft;
an exhaust flap forming part of a supercharging pressure control of a turbocharged internal combustion engine and arranged pivotally in the exhaust pipe for controlling an opening cross section of a bypass line in dependence on a compressor-side supercharging pressure, said exhaust flap being mounted on the actuator arm;
an adjustment lever to which the control rod is articulated at a joint connection; and
a friction damper connected in a force flow between the shaft and the control rod and formed by a spring arranged at the joint connection between the adjustment lever and the control rod and acting on the control rod and the adjustment lever in a region of the joint connection,
wherein the spring is formed by a U-shaped leg spring having legs acting on the control rod and on the adjustment lever,
wherein the leg spring is held non-pivotally in a defined position at the joint connection, and
wherein at least one of the legs of the leg spring has two border-side bevels which embrace a flattened portion of the control rod or the adjustment lever on both sides.

2. The actuating device of claim 1, wherein the exhaust gas flap is arranged in a housing of a turbine of an exhaust gas turbocharger, with the bypass line circumventing the turbine.

3. The actuating device of claim 1, wherein the joint connection comprises a bearing pin on which at least one of the control rod and the adjustment lever is mounted, said spring interacting with the bearing pin.

4. The actuating device of claim 1, wherein the spring is attached to a bearing pin via a one-sided open oblong hole on at least one of the leg of the leg spring in transverse relationship to a joint axis of the joint connection and held in a form-fitting manner in a pull-off direction.

5. The actuating device of claim 1, wherein the spring has at least one leg provided with a recess for positioning on a bearing pin, and further comprising at least one retaining ring secured on the bearing pin for holding the spring in place.

6. The actuating device of claim 3, further comprising at least one friction disk attached to the bearing pin and inserted between the control rod and the adjustment lever.

7. The actuating device of claim 1, wherein the leg spring has a semi-circular base portion provided with a slot-shaped recess for passage of the control rod.

8. The actuating device of claim 7, wherein the recess has a width substantially corresponding to a diameter of the control rod.

9. The actuating device of claim 3, wherein the bearing pin of the joint connection is secured by a rivet connection on the control rod or on the adjustment lever and has a shank defined by a diameter which is greater than a remaining portion of the bearing pin for insertion in a bearing bore of the adjustment lever or the control rod, and further comprising at least one retaining ring for holding the shank of the bearing pin in place.

10. An actuating device comprising:
a control rod;
a shaft rotatably mounted in an exhaust pipe and adjustable from outside the exhaust pipe via the control rod;
an actuator arm secured on the shaft;
an exhaust flap forming part of a supercharging pressure control of a turbocharged internal combustion engine and arranged pivotally in the exhaust pipe for controlling an opening cross section of a bypass line in dependence on a compressor-side supercharging pressure, said exhaust flap being mounted on the actuator arm;
an adjustment lever to which the control rod is articulated at a joint connection;
a friction damper connected in a force flow between the shaft and the control rod and formed by a spring arranged at the joint connection between the adjustment lever and the control rod and acting on the control rod and the adjustment lever in a region of the joint connection; and at least one retaining ring secured on the bearing pin for holding the spring in place, said spring being formed by at least one disk spring which is maintained under tension by the retaining ring.

\* \* \* \* \*